UNITED STATES PATENT OFFICE.

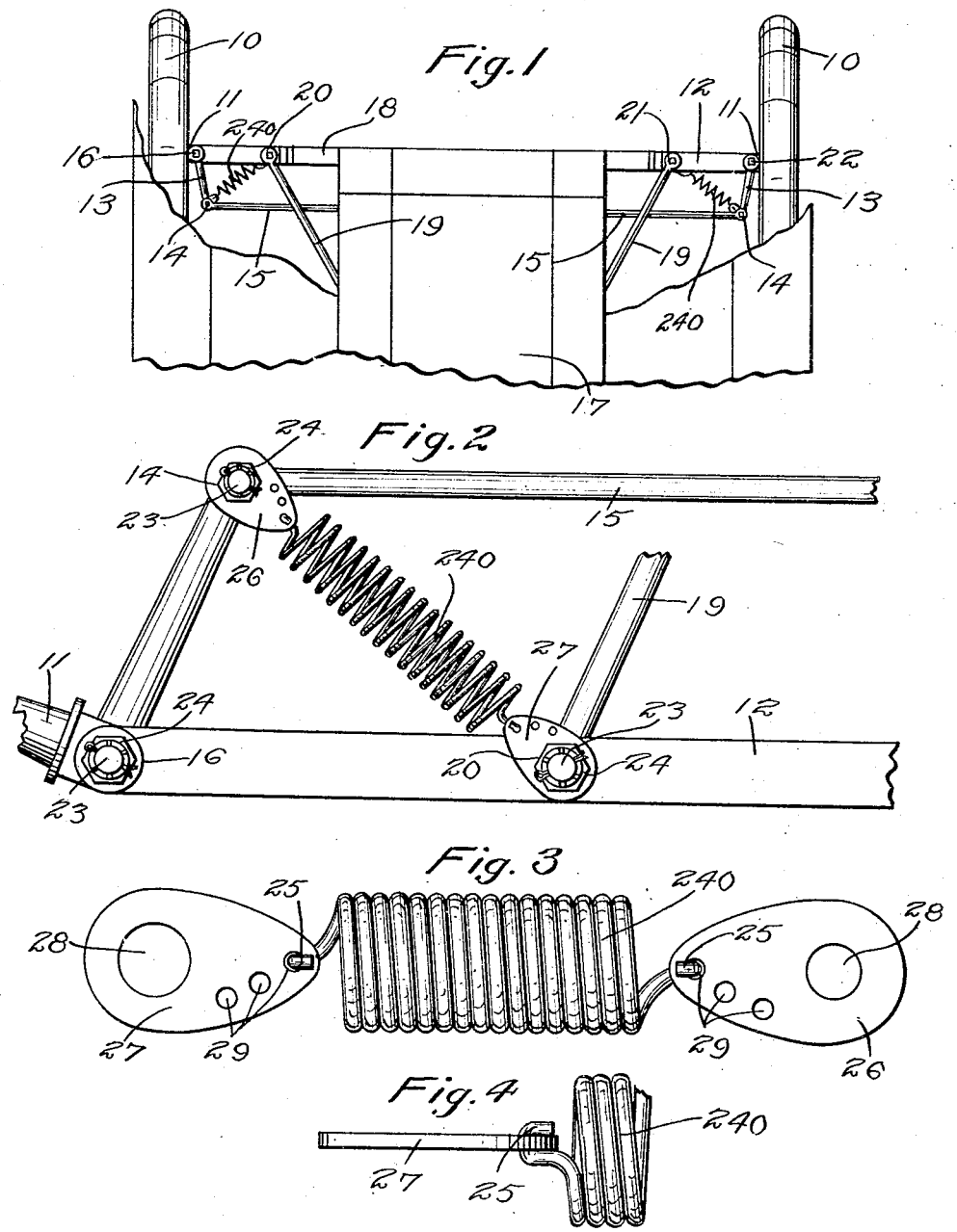

GEORGE H. WILSON, OF MINNEAPOLIS, MINNESOTA.

STEERING DEVICE FOR AUTOMOBILES.

1,265,982.        Specification of Letters Patent.        Patented May 14, 1918.

Application filed August 9, 1915. Serial No. 44,374.

*To all whom it may concern:*

Be it known that I, GEORGE H. WILSON, a citizen of the United States, residing at Minneapolis, in the county of Hennepin and State of Minnesota, have invented certain new and useful Improvements in Steering Devices for Automobiles, of which the following is a specification.

My invention relates to steering devices for automobiles and has for its object to provide a yielding device, preferably a spring or springs, attachable to the steering knuckle and front axletree for keeping the steering wheels in forward alinement in passing over rough roads and so lessening the strain on the driver's hands.

The full objects and advantages of my invention will appear in connection with the detailed description thereof and are particularly pointed out in the claim.

In the drawings, illustrating the application of my invention in one form,—

Figure 1 is a plan view of the front portion of an automobile with some parts removed, showing the application of my invention. Fig. 2 is a view of some of the parts shown in Fig. 1 looking upward. Fig. 3 is a plan view of one of my spring members removed from the car and Fig. 4 is a side view of a portion of the same.

My invention is shown applied to an ordinary automobile comprising a pair of front wheels 10 attached to spindles 11 pivoted at 16 and 22 to an axletree 12, said spindles secured to steering arms 13 which are pivoted by knuckles 14 to a steering rod 15. The axletree 12 is shown attached to the body 17 by means of a spring 18 and is stiffened by brace rods 19 pivoted to the same at 20 and 21. In the specific automobile illustrated, the various previously-mentioned pivots comprise bolts 23 secured by lock nuts 24.

My invention, as best shown in Figs. 3 and 4, comprises tension coil spring members 240 whose ends are bent to form hooks 25, and which hooks are inserted in attaching plates 26 and 27. These plates each have a hole 28 by means of which the plates are secured to the steering device, and also a series of holes 29 into which the hooked ends 25 of said coil spring can be inserted to procure different degrees of tension. Such a spring is inserted between each of the steering knuckles 14 and the corresponding pivot 20 or 21 of brace rods 19 by securing the attaching plates 26 and 27 to the same on the bolts 23 under the lock nuts 24, as shown in Fig. 2.

The operation of my device is manifest. The superfluous play in the various joints is taken up by these springs and the wheels are held normally in rigid alinement for traveling forward. Shocks to the wheels are also taken up by them and all undue strains are removed from the hands of the operator who may, if desired, remove his hands from the steering wheel without causing the automobile to swerve. The springs are put in tension as the wheels are oscillated for turning a corner, but said springs assist in restoring said wheels to the normal position and tend to keep them there.

I claim:

In combination with the front wheels of an automobile and means for oscillating the same for steering, a pair of oval-shaped plates, holes in the larger end thereof for attaching the same to the pintles of the steering knuckles, another pair of oval-shaped plates, holes in the larger end of said last-named plates for attaching the same to the brace bolts of the axletree, a pair of tension coil springs acting between said oval-shaped plates for holding the wheels normally in a forward traveling position, hooks bent on the ends of said springs, and a plurality of smaller holes in each of said oval-shaped plates varying in distance from the point of attachment of said plates for engagement with the hooks of said coil springs to give different amounts of tension in said coil springs.

In testimony whereof I affix my signature in presence of two witnesses.

GEORGE H. WILSON.

Witnesses:
H. A. BOWMAN,
F. A. WHITELEY.

Copies of this patent may be obtained for five cents each, by addressing the "Commissioner of Patents, Washington, D. C."